United States Patent
Bhatoolaul et al.

(10) Patent No.: US 6,992,998 B1
(45) Date of Patent: Jan. 31, 2006

(54) MESSAGE ACCESS FOR RADIO TELECOMMUNICATIONS SYSTEM

(75) Inventors: David Lahiri Bhatoolaul, Grange Park (GB); Qiang Cao, Swindon (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/936,102

(22) PCT Filed: Dec. 10, 1999

(86) PCT No.: PCT/GB99/04179

§ 371 (c)(1),
(2), (4) Date: Sep. 7, 2001

(87) PCT Pub. No.: WO00/56096

PCT Pub. Date: Sep. 21, 2000

(30) Foreign Application Priority Data

Mar. 18, 1999 (GB) .................................... 9906198

(51) Int. Cl.
*H04Q 7/00* (2006.01)
*H04B 7/216* (2006.01)

(52) U.S. Cl. ..................... 370/329; 370/335

(58) Field of Classification Search ................ 370/335, 370/342, 329, 337; 455/455
See application file for complete search history.

(56) References Cited

U.S. PATENT DOCUMENTS

| | | | |
|---|---|---|---|
| 5,754,541 A | 5/1998 | Glisic et al. ................. | 370/335 |
| 6,381,229 B1 * | 4/2002 | Narvinger et al. ........... | 370/328 |
| 6,483,826 B1 * | 11/2002 | Akerberg ..................... | 370/335 |
| 6,519,240 B1 * | 2/2003 | Dillinger et al. ............. | 370/337 |
| 6,621,803 B2 * | 9/2003 | Halton et al. ................ | 370/329 |
| 6,643,275 B1 * | 11/2003 | Gustafsson et al. .......... | 370/328 |

FOREIGN PATENT DOCUMENTS

| | | |
|---|---|---|
| EP | 0 933 955 A | 11/1998 |
| WO | WO 98/18280 | 4/1998 |
| WO | WO 98/53631 A | 11/1998 |

* cited by examiner

*Primary Examiner*—Chau Nguyen
*Assistant Examiner*—Jung Park

(57) ABSTRACT

A mobile for use in the UMTS is arranged, on activation to read the Broadcast Control Channel (BCCH) for all available preamble signatures; to store the signatures in its processor; to read the Acquisition Indication Channel (AICH) for acquisition indicators sent to other mobiles; to store usage of other mobiles against each signature; and to select when required a signature the recorded usage of which is unlikely to cause collisions.

4 Claims, 4 Drawing Sheets

MESSAGE ACCESS FOR RADIO TELECOMMUNICATIONS SYSTEM

BACKGROUND OF THE INVENTION

1. Field of the Invention

This invention relates to an improved message access arrangement for a radio telecommunications system such as Universal Mobile Telecommunications System (UMTS) and relates especially to the selection of preamble signatures.

2. Description of the Related Art

During the set up of a call from a mobile telephone to the UMTS system, a mobile needs to select a preamble signature from the available signatures; subsequently, while waiting for an acquisition indication, the mobile may reselect a signature. It may occur that the mobile selects a signature associated with a stalled state, or that collisions occur, and call connection is delayed.

In WO98/18280 Ericsson, there is disclosure of a mobile telecommunication system in which each mobile requesting access can transmit one of a number of different preamble bit or signal patterns, referred to as "signatures", stored in an internal memory location. The mobile selects one of the stored signatures randomly. However, the arrangement does not address the issue of avoiding stalled states or collisions.

BRIEF SUMMARY OF THE INVENTION

It is an object of the invention to improve the efficiency of signature selection by a mobile.

According to the invention a mobile telephone for the universal radio mobile telecommunication system comprises a processor, a transmitter/receiver, and an antenna, characterised in that the processor is arranged, when the mobile is in an active mode to monitor the Acquisition Indication Channel (AICH) of the UMTS; to store for the duration of the active mode the usage by other mobiles of each available preamble signature; and to select when required a signature the recorded usage of which is unlikely to cause collisions.

BRIEF DESCRIPTION OF THE DRAWINGS

In the accompanying drawings, the prior art is illustrated in FIGS. 1–7 in which.

The invention will be described with reference to FIG. 8, which is a flow chart in a mobile system for signature selection.

DETAILED DESCRIPTION

Figure 1:
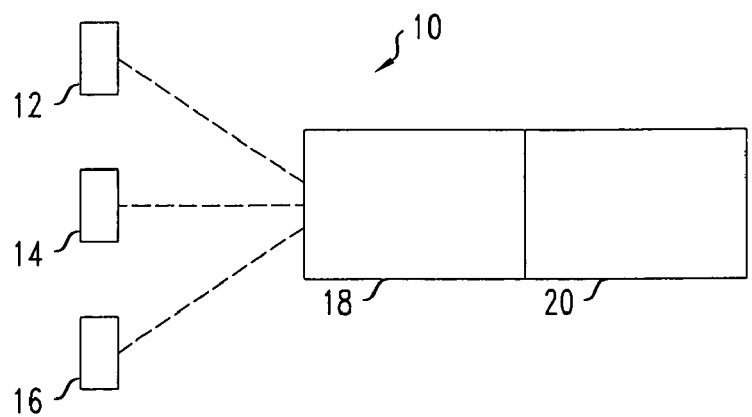
FIG. 1 is a schematic diagram of a part of a radio telecommunications system.

In FIG. 1, a part 10 of the UMTS is illustrated, comprising a plurality of mobile systems (MS) 12, 14, 16 associated with a telecommunications cell controlled by a Base Transceiver Station (BTS) 18 having a Base Station Controller (BSC) 20.

Figure 2:
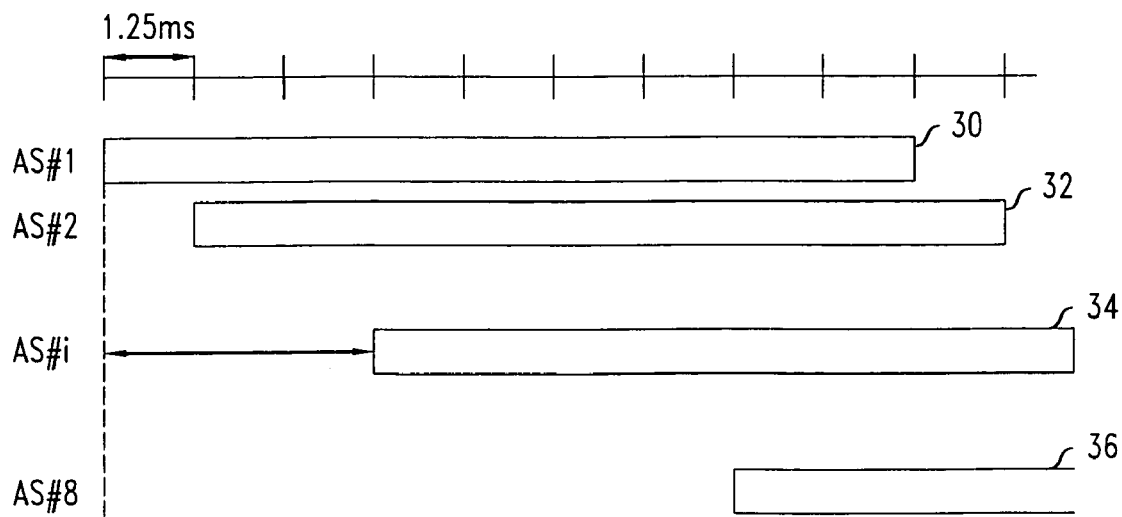
FIG. 2 illustrates a physical random access channel slots structure.

When a mobile such as 12 wishes to make a call, it utilises the Random Access Channel (RACH) of the UMTS which is mapped to the Physical Random Access Channel (PRACH). Transmission in this transport channel is based on the well known slotted Aloha approach, that is, a mobile can start a transmission of the PRACH at any one of a number of well defined time offsets, denoted access slots AS and illustrated in FIG. 2. The slots are spaced 1.25 milliseconds apart. Several of the slots in FIG. 2 are shown as filled by random access transmissions 30, 32, 34, 36.

Figure 3:
FIG. 3 illustrates the structure of a random access transmission.

FIG. 3 illustrates the structure of a Random Access Transmission such as transmission 30; there are several preamble parts 40a, 40b, 40i, each of length 1 millisecond, and an access burst 42 which contains the preamble part, plus a message part of length 10 milliseconds.

Figure 4:
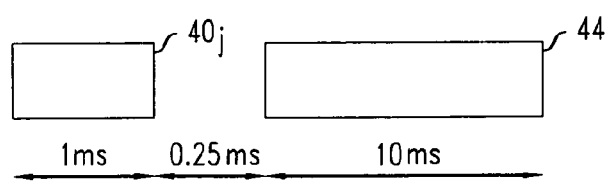
FIG. 4 illustrates the structure of an access burst from a mobile.

FIG. 4 shows the structure of the access burst 42. Between a preamble 40j and the message part 44 there is an idle time period of length 0.25 milliseconds. This idle period allows for detection of the preamble part and subsequent online processing of the message part.

Figure 5:
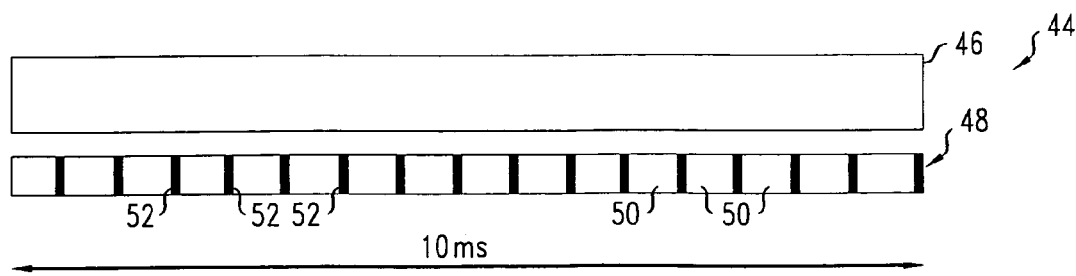
FIG. 5 illustrates the message part of the random access burst.
Figure 6:
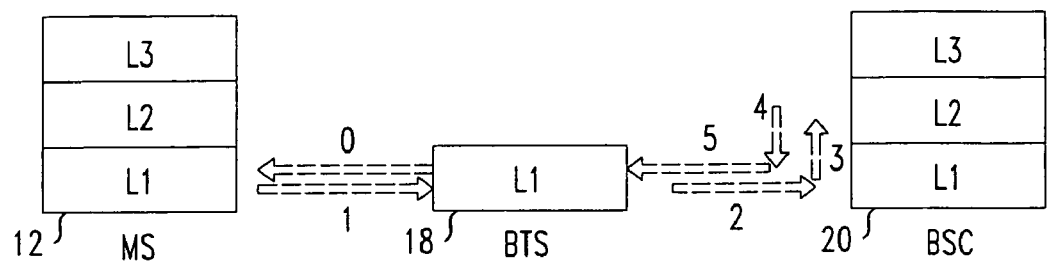
FIG. 6 illustrates the layers involved in message acknowledgement.

FIG. 5 shows that the RACH message part 44 consists of a data part 46, corresponding to the uplink Dedicated Physical Data Channel (DPDCH) and a Layer 1 control part 48, corresponding to the uplink Dedicated Physical Control Channel (DPCCH). The data and control parts 46, 48 are transmitted in parallel.

The data part 46 carries Layer 2/Layer 3 messages requesting radio resources or a user packet. The spreading factor of the data part is limited to $SF_c\{256, 128, 64, 32\}$ corresponding to channel bit rates of 16, 32, 64 and 128 Kbps respectively. The control part 48 carries pilot bits 50 and rate information 52, using a spreading factor of 256. The rate information indicates a spreading factor of the channelisation code which is used on the data part.

For RACH transmission, the technique of preamble power ramping is used, and the procedure used by a random request has the following actions:

1 After cell search and synchronisation the mobile 12 reads the Broadcast Control Channel (BCCH) (not illustrated) to get information about
  i the preamble spreading code(s)
  ii the available signatures
  iii the available access slots
  iv the available spreading factors for the message part
  v the uplink interference level in the cell
  vi the primary CCPCH (Common Control Physical Channel) transmit power level
2 The MS selects a preamble spreading code and thus the message scrambling code.
3 The MS selects a preamble signature and uses it to determine the primary node of the channelisation codes used by the message part of the access burst.
4 The MS selects a channelisation code (corresponding to a spreading factor) for the message part.
5 The MS estimates the downlink path loss (by using information about the transmitted and received power level of the primary CCPCH), and determines the required uplink transmit power (by using information about the uplink interference level in the cell).
6. The MS implements the dynamic persistence algorithm by:
  Reading the current dynamic persistence value from the BCH.

Performing a random draw against the current dynamic persistence value.

Deferring transmission for one frame and repeating step 6 if the result of the random draw is negative, otherwise proceeding to step 7.

Figure 7:
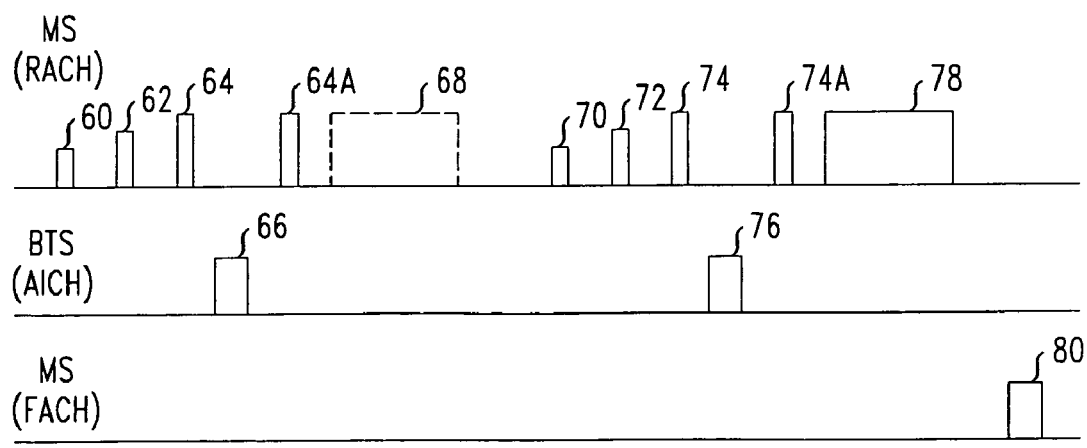
FIG. 7 illustrates how random access acquisition indication and forward access channels interact to acknowledge preamble and message signals from a mobile.

7. The MS randomly selects an access slot from the available access slots.
8. The MS transmits its preamble at a negative power offset relative to the estimated uplink transmit power. This is illustrated at reference 60 in FIG. 7.
9. The MS waits for an acquisition indication (on the AICH) from the network side. If none is received within a predefined time-out period, the MS transmits the preamble again but with a smaller power offset and a re-selected preamble signature, reference 62, showing the higher power.
10. Step 8 is repeated, reference 64, showing a further increase in power, and an acquisition indicator 66 is received from the network side that indicates the acceptance by the network side of the preamble at that power offset. The acquisition indicator 66 is received on the AICH.
11. If an acquisition indicator is received on the AICH in Step 9, the random access burst is transmitted in the next available access slot. This burst comprises a repeated preamble 64A and a message 68.
12. If the message 68 is corrupted, as indicated by the dotted lines, then there is no positive acknowledgement and actions 1 to 11 are repeated, references 70 to 78; message 78 is successfully received, and an acknowledgement 80 is sent from the network on FACH.

It is clear that the MS 12 selects a preamble signature in action 3, and often reselects a preamble signature in action 9. Each selection may suffer from collisions or the selection of a preamble signature used by a stalled state.

Figure 8:
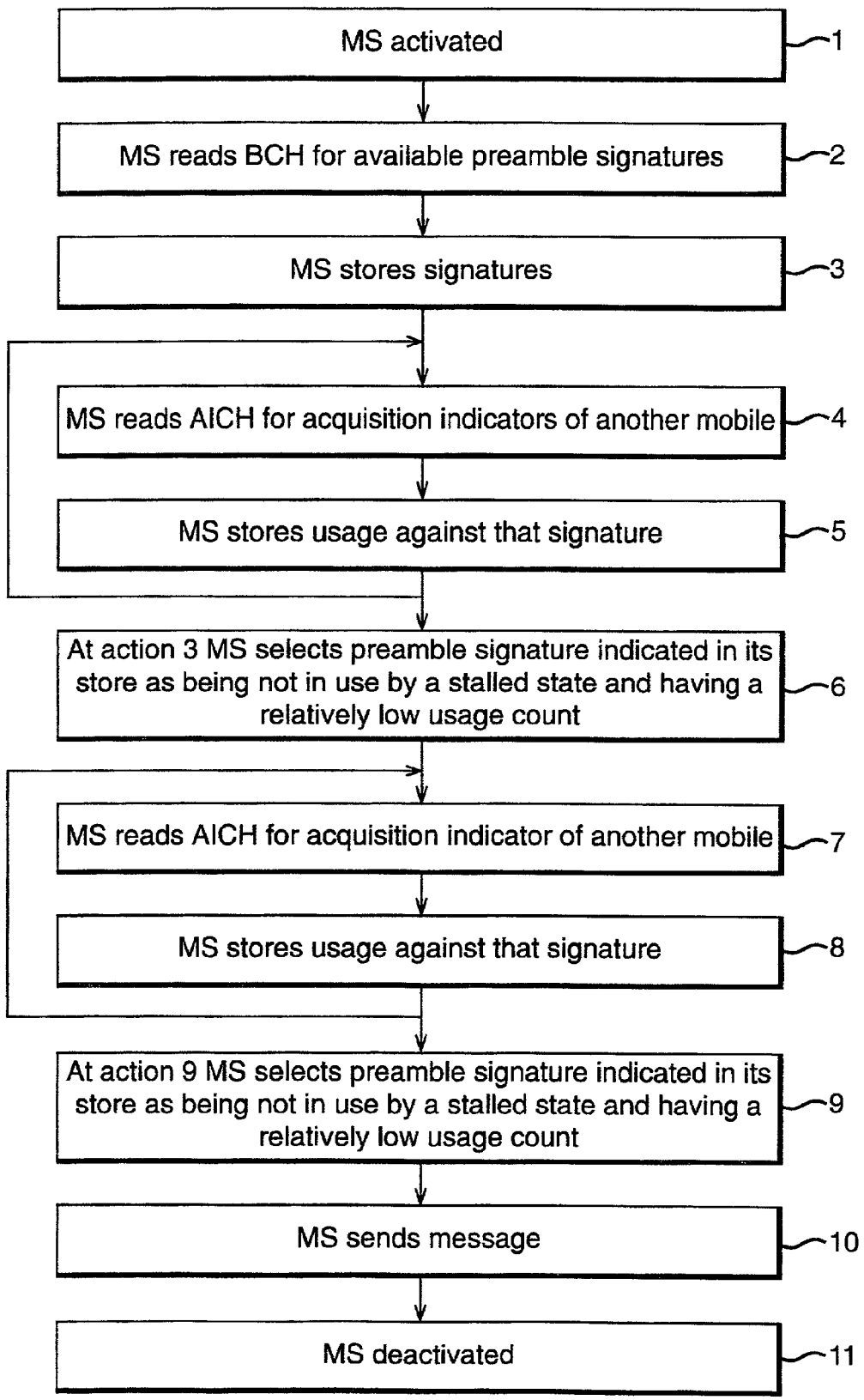

Referring now to FIG. 8, which illustrates the inventive method, in step 1 the MS, such as MS 12, is activated. In step 2. MS 12 reads the BCH, and in step 3 records the available signatures in its processor. In step 4 the MS 12 reads the AICH; when the BTS 18 sends an acquisition indication to another mobile, MS 12 records this usage of a particular signature in its processor (step 5).

The processor of the MS stores a set of preamble signatures available to the MS. If a signature is in use by a stalled state it is indicated as not available. Of the available signatures, the store records the usage count of each signature. The signatures are divided into relatively high and relatively low usage counts. The MS randomly selects one of the relatively low usage count signatures which is not indicated as unavailable due to use by a stalled state at step 6 or step 9.

Step 6 corresponds to action 3 above. Before selecting a preamble signature, the MS 12 checks its store and randomly selects from a set of preamble signatures which have a low usage count and are not used by any stalled state. The usage count of each preamble signature is refreshed by triggering, eg when the available preamble signatures change on the broadcast channel. It then performs the rest of action 3 and proceeds to action 4 etc. Simultaneously, in step 7, the MS 12 continues to read the AICH and in step 8 records any further acquisition indicators for other mobiles.

Step 9 corresponds to action 9 above. Before reselecting a preamble signature, the MS 12 checks its store and selects randomly a signature from a set of preamble signatures with the lowest usage count and which are not being used by any stalled state. The reselection step may be repeated. In step 10, the MS 12 sends its message, and in step 11 it is deactivated as the call terminates.

By application of the invention, the knowledge of the usage status for each available preamble signature allows a reduction in the number of unsuccessful preamble detections by the BTS 18, and reduces the unsuccessful decoding of messages by the BTS. Over all, the usage efficiency of the RACH is improved.

What is claimed is:

1. A mobile telephone for the universal radio mobile telecommunications system comprising, a processor, a transmitter/receiver, and an antenna, arranged, during call set-up, to transmit an access packet to a base station, said packet comprising a preamble including one of a plurality of available preamble signatures previously obtained from the base station and stored by the mobile, characterized in that the processor is arranged, when the mobile is in an active mode to monitor the acquisition indication channel of the system; to store for the duration of the active mode the usage by other mobile telephones of each available preamble signature; and to select when required a signature the recorded usage of which is unlikely to cause collisions.

2. A mobile telephone according to claim 1 in which, for selection of a preamble signature for the determination of the primary node of the channelisation codes used by a message part of an access burst from the mobile, the mobile telephone selects a signature indicated in its store as being unused by other mobiles.

3. A mobile telephone according to claim 1 or claim 2 in which, for reselection of a preamble signature, the mobile telephone selects a signature indicated in its store as being least used by other mobile telephones.

4. A method of operation, in a radio mobile telecommunications system comprising: a plurality of mobile telephones and a base transceiver station providing an acquisition indication channel, in which each mobile telephone obtains from the base station a plurality of available preamble signatures and stores said signatures;

during call set-up, a mobile transmits an access packet to the base station including one of said signatures, characterized in that:

each active mobile monitors the acquisition indication channel for usage by other mobile telephones as available preamble signatures, and stores said usage; and each mobile selects when required a signature the recorded usage of which is unlikely to cause collisions.

* * * * *